G. J. & C. BLAZEK.
SPRING WHEEL.
APPLICATION FILED MAR. 15, 1911.
1,033,299.
Patented July 23, 1912.
3 SHEETS—SHEET 1.
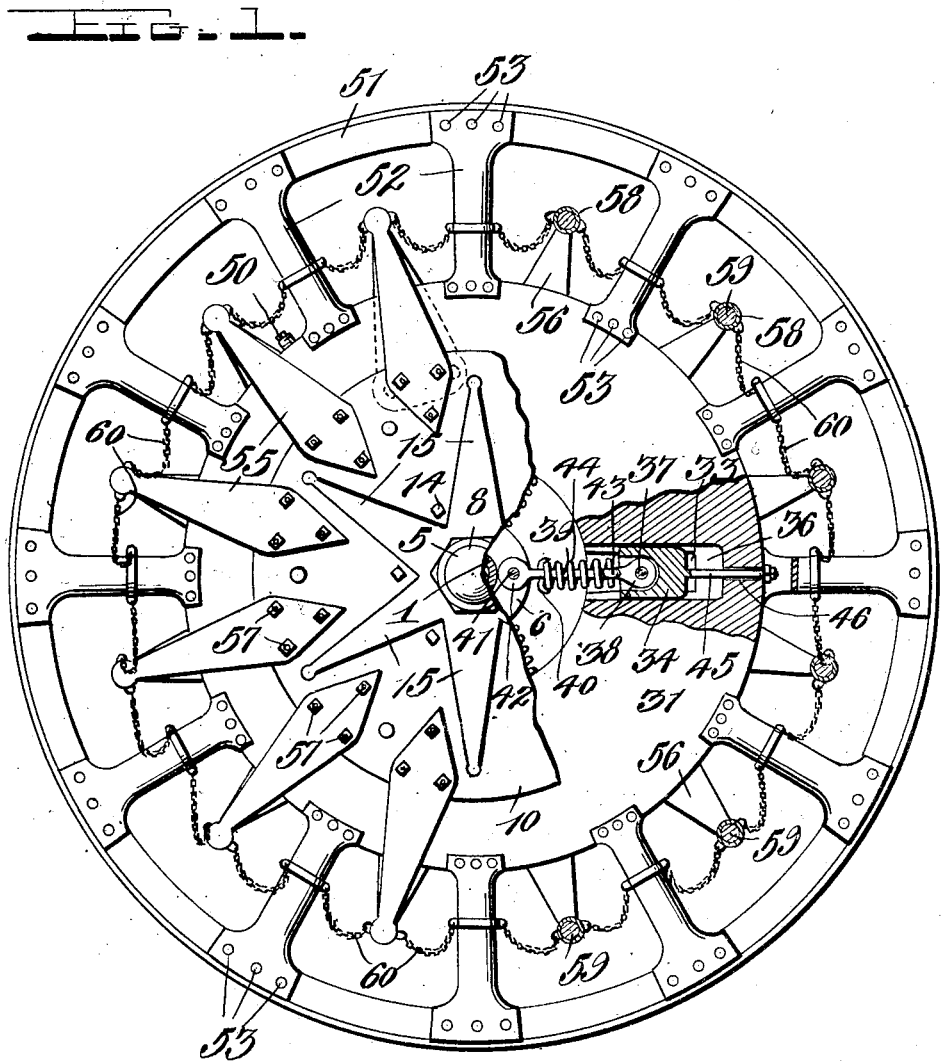
Witnesses
Chas. L. Griesbauer.
L. G. Ellis.
Inventors
G. J. Blazek and
C. Blazek,
By Watson E. Coleman,
Attorney

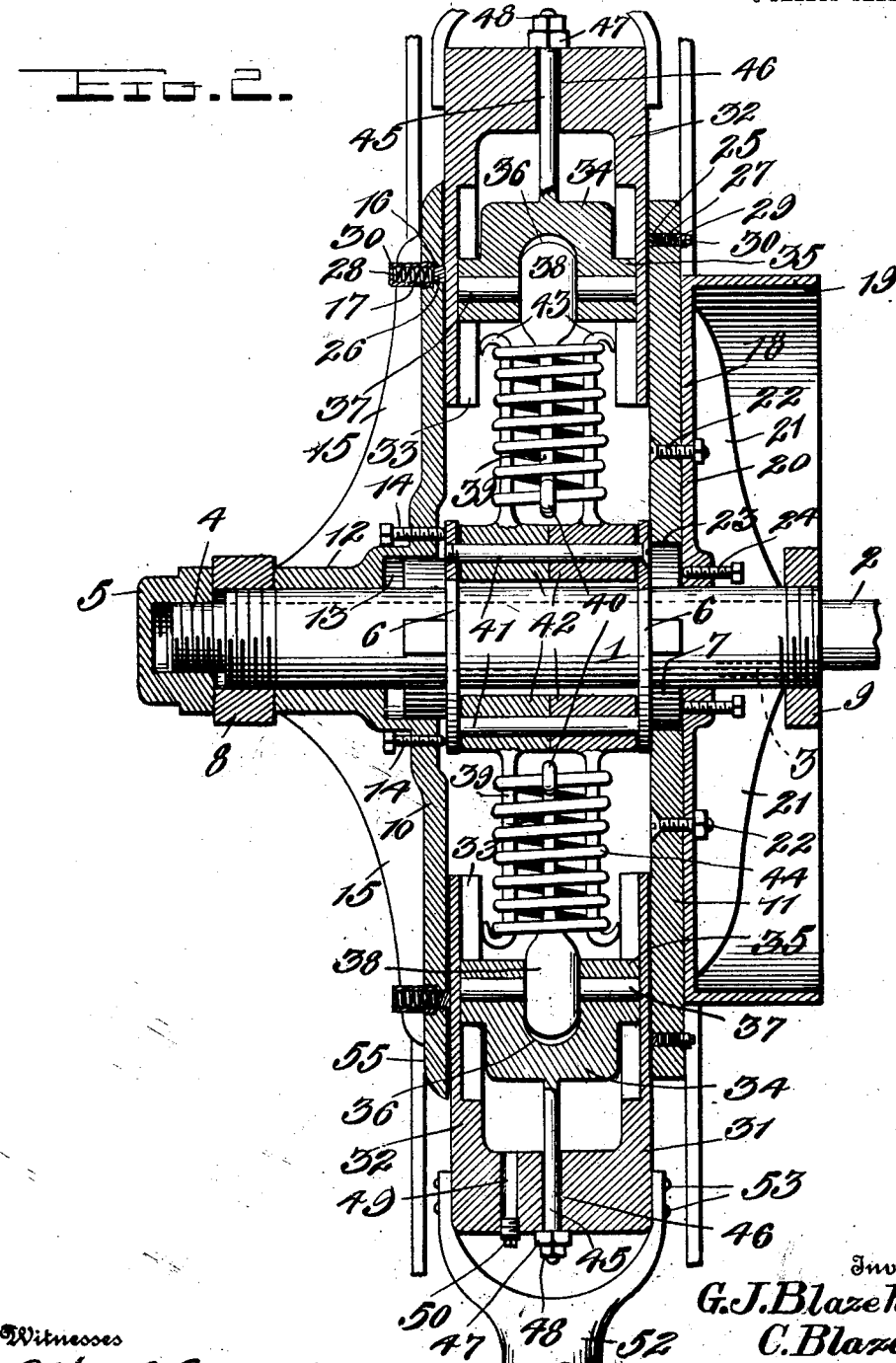

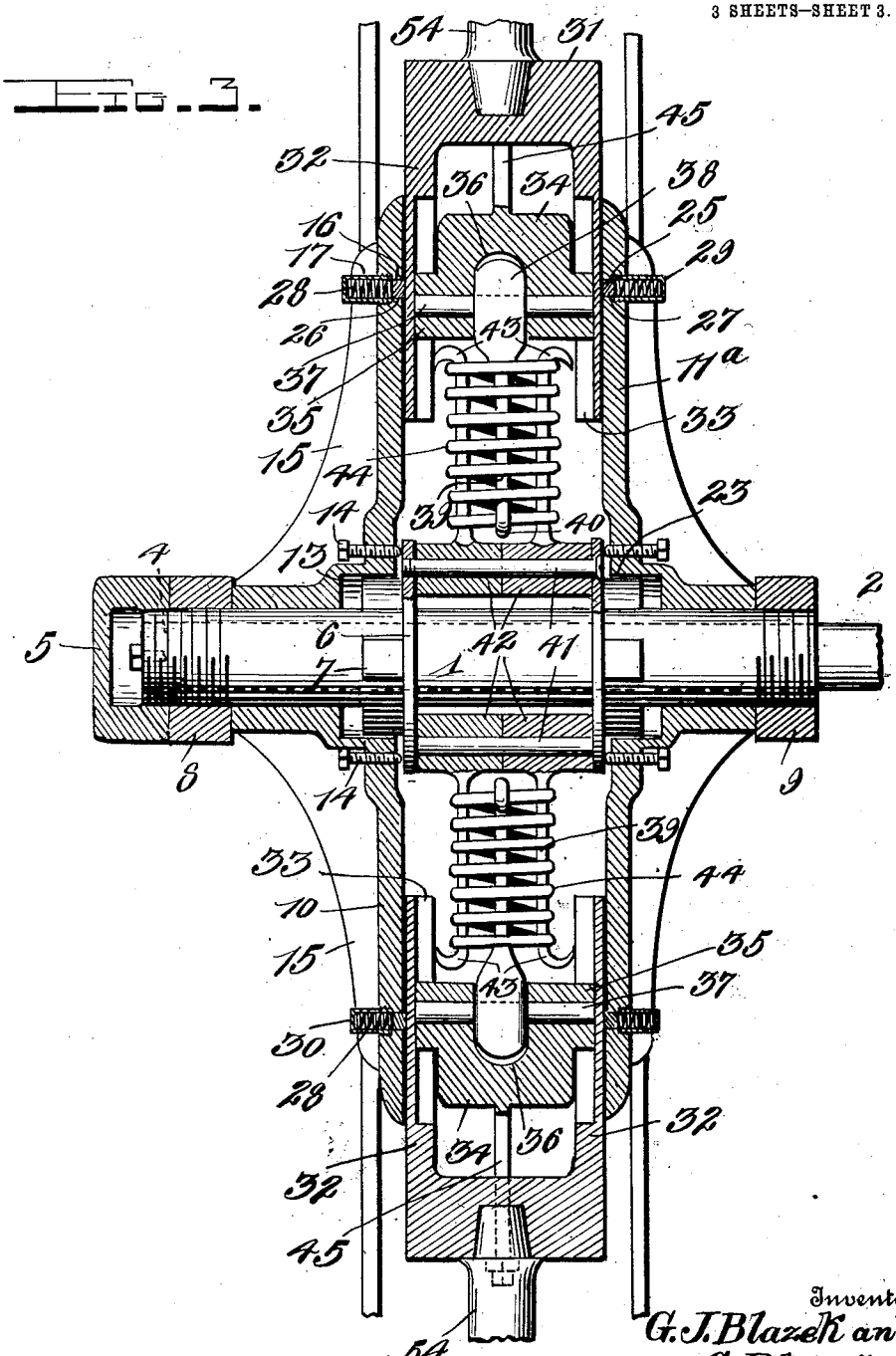

UNITED STATES PATENT OFFICE.

GEORGE J. BLAZEK AND CHARLES BLAZEK, OF RED LAKE, SOUTH DAKOTA.

SPRING-WHEEL.

1,033,299.

Specification of Letters Patent.

Patented July 23, 1912.

Application filed March 15, 1911. Serial No. 614,610.

*To all whom it may concern:*

Be it known that we, GEORGE J. BLAZEK and CHARLES BLAZEK, citizens of the United States, residing at Red Lake, in the county of Brule and State of South Dakota, have invented certain new and useful Improvements in Spring-Wheels, of which the following is a specification, reference being had to the accompanying drawings.
Our invention relates to improvements in spring wheels, and especially with reference to improvements in spring hubs for automobile wheels, which spring hubs absorb the shocks, enable the automobile to ride easily, and without jarring and unpleasant motion, and enable the pneumatic tires ordinarily employed on automobile wheels to be dispensed with, the invention consisting in the construction, combination and arrangement of devices, hereinafter described and claimed.

In the accompanying drawings—Figure 1 is a side elevation of a portion of an automobile wheel provided with a spring hub constructed in accordance with our invention, parts of the hub being removed so as to disclose interior constructions. Fig. 2 is a vertical central sectional view of the same. Fig. 3 is a similar view showing a modified construction.

In the embodiment of our invention, we provide a central hub member 1, which is here shown as a tubular sleeve adapted to be placed on the spindle of an axle 2. When the wheel is a driving wheel, for use on a rear driving axle, the hub member 1, is secured to the spindle of the axle for rotation therewith by means of suitable keys 3. Where the wheel is a front wheel its hub member 1 is mounted to turn freely on the spindle of the axle. The axle spindle is provided at its outer end with a threaded portion 4, to which a cap nut 5 may be screwed. The hub member 1 is provided at a suitable distance apart, and at suitable distances from its ends with a pair of annular circumferential flanges 6 on the outer sides of which are key enlargements 7. The ends of the central hub member are exteriorly threaded to receive a nut 8 and a nut 9. On the hub member 1 are front and rear disks 10, 11. The front disk 10 is formed with a centrally disposed hub portion 12, through which the front portion of the hub member 1 extends, the said hub portion 12 being provided with recesses 13, on its inner side, which form seats for the reception of the front or outer key enlargement 7 of the hub member 1. The nut 8 bears against the outer side of the hub portion 12 of the disk 10, and the said disk is provided with bearing screws 14, the inner ends of which bear against the front side of the front or outer flange 6. It will be understood that by the provision of the nut 8, and the bearing screws 14, the front disk 10 may be adjusted on the hub member 1 to compensate for wear. The said front disk 10 is provided on its front side with radially disposed reinforcing webs 15. Said disk is provided on its inner side with an annular concentric groove 16 of suitable width and diameter. The disk is also provided with suitable openings 17, the inner ends of which communicate with the said groove or channel 16.

The rear disk 11 where the wheel is a rear driving wheel, has a member 18, which forms a brake band and comprises an annular tread portion 19, and a web 20, the latter being formed with radial reinforcements 21. The disk 11 and the member 18, which is secured thereto by bolts 22, form an annular seat 23 for the rear or inner annular enlargement 7, of the central hub member 1, and the member 18 which is in effect a portion of the disk 11, and the rear side of which is engaged by the nut 9, is provided with bearing screws 24 which engage the rear side of the said enlargement 7, and together with the nut 9, adapt the rear disk 11 to be adjusted as may be required on the central hub member 1. The disks 10, 11 being firmly clamped by the nuts 8, 9, and the bearing screws 14, 24, revolve with the central hub member 1. The rear or inner disk 11, is provided on its front side with an annular circumferential channel or groove 25. Packing rings 26, 27 which are preferably made of suitable metal, are respectively disposed in the grooves or channels 16, 25 and are held in place respectively by springs 28, 29, the said springs being disposed in transverse openings in the disks, and being engaged at their outer ends by cap nuts or studs 30, which are screwed in the outer ends of the said openings.

Our improved hub is also provided with an annular outer member 31, which while normally concentric with the inner member 1, is movable radially and eccentrically with reference thereto. This outer member 31, is provided at its sides with inwardly extending spaced annular flanges or webs 32, which extend between the disks 10, 11, move and play radially and eccentrically between the said disks, and are engaged by the packing rings 26, 27, the said packing rings being firmly held against the outer sides of the said webs or flanges 32, by the action of the springs 29, and serving to prevent the escape of oil from between the opposing faces of the disks and the outer hub member and also serving to prevent dirt from working inwardly between the said opposing faces.

In the opposing sides of the webs or flanges 32, of the outer hub member 31, at suitable points are radial grooves 33, which are open at their inner ends. Cross heads 34 are arranged and radially movable between the webs or flanges 32, of the outer hub member 31, and are guided and held in place by bosses 35 at the ends of said cross heads, and which provide and are guided in the slots 33. Each cross head has a central recess 36, which is open at the inner side of the cross head, and a pivot pin 37, also extends from end to end of each cross head, concentrically with the bosses 35, and also extends across the recess 36. In the recess 36 of each cross head is the eye 38, at the outer end of a hook link 39, the eye of which is engaged by the pin 37, and hence the said hook links are pivotally connected to the cross heads. Each hook link is provided at its inner end with a pair of oppositely extending bills 40. The flanges 6 of the central hub member are connected together at suitable points by screws 41, which form the pivots for pairs of hook links 42. The said hook links are provided at their outer ends with oppositely extending bills 43. Coiled cushioning springs 44 extend around the pairs of links 42, and are engaged at their outer ends by the bills 43, the inner ends of the said cushioning springs being engaged by the oppositely extending bills 40 of the hook links 39. Hence the hook links and the springs 44, form connections between the outer hub member 31, and the central or inner hub member 1, which connections are slidable, and while the springs 44 counteract one another, and normally keep the member 31 concentric with the member 1, they yield under shocks when the wheel is moving over uneven road surfaces, and permit radial and eccentric movements of the outer hub member 31, and absorb the shocks, so as to cause the car to ride evenly and smoothly. Each cross head is provided with an outwardly extending bolt 45, to limit the radial play thereof, the said bolts extending through without engaging radial openings 46 in the outer hub member 31, and being each provided at its outer end with a nut 47, to form a stop nut and a locking nut or jam nut 48, to hold the stop nut in place. The outer hub member 31 is also provided at a suitable point with a radial opening 49, through which lubricating oil may be introduced to the space between the outer and inner hub members 31, 1, and the disks 10, 11. A stop plug 50 is screwed in the outer end of the said opening 49.

The felly 51 of the wheel is connected to the outer hub member 31, by means of suitable spokes. In the form of our invention shown in Figs. 1 and 2, the spokes 52 are made of pressed steel and are secured at their inner and outer ends to the hub member 31, and the felly 51, by means of rivets 53. In the form of our invention shown in Fig. 3, the spokes 54 are wooden spokes, the inner ends of which are socketed in the hub member 31. In Fig. 3, in which the wheel is adapted to turn on the spindle of the axle, the inner disk 11ª is substantially identical in construction with the outer disk 10, and the brake band 19 shown in Fig. 2, is dispensed with.

In order to strengthen the disks 10, 11 of our improved spring hub, we provide the same respectively, with radial guide arms 55, 56, the inner ends of which bear on the outer sides of and are secured to the said disks by means of bolts or rivets 57. These guide arms are co-incident with the spaces between certain of the spokes and project beyond the periphery of the outer hub member 31. Tubular spacers 58, are interposed between the outer ends of the said guide and brace arms, and are secured in place by means of bolts 59, which extend through said tubular spacers and also through the said guide and brace arms. To prevent the spacers from striking and injuring the spokes when the car starts suddenly, the outer ends of the guide and brace arms may be connected to the spokes by slack chains 60.

By the use of our improved spring hub injury to the transmission and differential gears is avoided as they are prevented from being stripped when starting the car or when changing speeds. On heavy loads and hard pulls the springs act efficiently and make the wheels so resilient as to prevent the car from riding unevenly and from starting with a jerk.

While we have herein shown and described what we now consider a preferred embodiment of our invention, we would have it understood that minor changes in the form, proportion, and construction of the several parts may be made without departing from the spirit of our invention, as defined by the appended claims.

We claim:—

1. In a spring wheel hub, the combination of an inner or central hub member provided with outwardly extending spaced flanges, disks on said central hub member movable toward and from each other, and provided with bearing screws engaging said flanges, securing nuts screwed on the said central hub member, and bearing against the outer sides of the said disks, an outer hub member movable radially and eccentrically in the space between the said disks and connections, including cushioning devices between said central and outer hub members.

2. In a spring wheel hub, the combination of a central hub member provided with outwardly extending spaced flanges, disks on said central hub member and disposed at the outer sides of said flanges, an outer hub member having spaced inwardly extending flanges disposed between said disks and provided on their inner sides with radial guide slots, cross heads between the flanges of the outer hub member, having outwardly extending bosses operating in said guide slots, the said cross heads being each provided with a central recess open on its inner side, hook links having their inner ends pivotally mounted between the flanges of the inner hub member, hook links having their outer ends pivotally mounted in the recesses of the cross heads, cushioning springs connecting the said hook links and co-acting therewith to form slidable cushioning connections between the inner hub member and the cross heads, and connections, admitting of the radial movement of the cross heads, between the latter and the outer hub member.

In testimony whereof we hereunto affix our signatures in the presence of two witnesses.

GEORGE J. BLAZEK.
CHARLES BLAZEK.

Witnesses:
CORA P. WEAVER,
J. A. STRAUSKY.